United States Patent
Meinl et al.

(10) Patent No.: US 12,222,435 B2
(45) Date of Patent: Feb. 11, 2025

(54) METHOD FOR EVALUATING RADAR SIGNALS IN A RADAR SYSTEM INCLUDING MULTIPLE SENSOR UNITS

(71) Applicant: Robert Bosch GmbH, Stuttgart (DE)

(72) Inventors: Frank Meinl, Leonberg (DE); Robert Nabholz, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 536 days.

(21) Appl. No.: 17/447,639

(22) Filed: Sep. 14, 2021

(65) Prior Publication Data
US 2022/0091226 A1    Mar. 24, 2022

(30) Foreign Application Priority Data
Sep. 21, 2020   (DE) .......................... 102020211745.4

(51) Int. Cl.
G01S 7/02       (2006.01)
G01S 13/931     (2020.01)

(52) U.S. Cl.
CPC .............. *G01S 7/02* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 2014/0035774 A1* | 2/2014 | Khlifi | ...................... | G01S 7/006 342/21 |
| 2018/0203111 A1* | 7/2018 | Yu | .......................... | B60Q 9/008 |
| 2020/0233059 A1* | 7/2020 | Brett | ....................... | G01S 7/352 |

OTHER PUBLICATIONS

"AWR1642 Single-Chip 77- and 79-GHZ FMCW Radar Sensor," Datasheet SWRS203A—A Revision, Texas Instruments, Inc., 2018, pp. 1-89.
Richards, "Noncoherent Integration Gain, and Its Approximation," Georgia Institute of Technology, Tech. Rep., 2010, pp. 1-10. https://cpb-us-w2.wpmucdn.com/sites.gatech.edu/dist/5/462/files/2016/12/Noncoherent-Integration-Gain-Approximations.pdf.
Singh et al., "AWR 1642 Mmwave Sensor: 76-81-GHZ Radar-On-Chip for Short-Range Radar Applications," White Paper SPYY006, Texas Instruments, Inc., 2017, pp. 1-8.

* cited by examiner

*Primary Examiner* — Whitney Moore
(74) *Attorney, Agent, or Firm* — NORTON ROSE FULBRIGHT US LLP; Gerard A. Messina

(57) ABSTRACT

A method for evaluating radar signals in a radar system including multiple sensor units, which are each capable of detecting objects in the surroundings of the radar system, the detection areas of the sensor units at least overlapping one another. In the method, each sensor unit calculates a short message from the radar signals received by it, whose data volume is smaller than the complete detection result, but which at least contains data which allow for the identification of potential objects and for the determination of a probability that the potential object is a real object, and at least one evaluation instance receives the entirety of all short messages of all sensor units and, on the basis of these short messages and selected detection results of the sensor units, calculates a consolidated detection result.

13 Claims, 4 Drawing Sheets

K1

|   | D   | V   | Q  |
|---|-----|-----|----|
| A | 84  | -12 | 7  |
| B | 27  | 0   | 10 |
| C | 70  | 13  | 6  |
| D | 126 | 11  | 6  |
| E | 16  | 21  | 9  |
| F | 120 | -24 | 7  |

K2

|   | D   | V   | Q |
|---|-----|-----|---|
| G | 80  | -12 | 6 |
| C | 70  | 13  | 9 |
| H | 126 | 12  | 7 |
| E | 16  | 21  | 5 |

K3

|   | D   | V   | Q  |
|---|-----|-----|----|
| A | 84  | -12 | 4  |
| B | 27  | 0   | 4  |
| I | 71  | 13  | 6  |
| J | 125 | 11  | 10 |
| E | 16  | 21  | 3  |
| F | 120 | -24 | 3  |
| K | 17  | -24 | 7  |

K1 & K2

|   | D   | V   | Q        |
|---|-----|-----|----------|
| A | 84  | -12 | 7        |
| B | 27  | 0   | 10       |
| C | 70  | 13  | 6+9=17   |
| D | 126 | 11  | 6        |
| E | 16  | 21  | 9+5=14   |
| F | 120 | -24 | 7        |
| G | 80  | -12 | 6        |
| H | 126 | 12  | 7        |

K1 & K2 & K3

|   | D   | V   | Q        |
|---|-----|-----|----------|
| A | 84  | -12 | 7+4=11   |
| B | 27  | 0   | 10+4=14  |
| C | 70  | 13  | 17       |
| D | 126 | 11  | 6        |
| E | 16  | 21  | 14+3=17  |
| F | 120 | -24 | 7+3=10   |
| G | 80  | -12 | 6        |
| H | 126 | 12  | 7        |
| I | 71  | -24 | 7        |
| J | 125 | 11  | 10       |
| K | 17  | -24 | 7        |

K0

|   | D   | V   | Q  |
|---|-----|-----|----|
| A | 84  | -12 | 11 |
| B | 27  | 0   | 14 |
| C | 70  | 13  | 17 |
| E | 16  | 21  | 17 |
| F | 120 | -24 | 10 |
| J | 125 | 11  | 10 |

FIG. 5

METHOD FOR EVALUATING RADAR SIGNALS IN A RADAR SYSTEM INCLUDING MULTIPLE SENSOR UNITS

CROSS REFERENCE

The present application claims the benefit under 35 U.S.C. § 119 of German Patent Application No. DE 102020211745.4 filed on Sep. 21, 2020, which is expressly incorporated herein by reference in its entirety.

BACKGROUND INFORMATION

The present invention relates to a method for evaluating radar signals in a radar system including multiple sensor units, which are each capable of detecting objects in the surroundings of the radar system, the detection areas of the sensor units at least overlapping one another.

In particular, the present invention relates to a radar system for motor vehicles. Such radar systems are used to detect objects in the surroundings of the vehicle and to provide location data about these objects for various driver assistance or safety functions, for example, adaptive cruise control or an automatic emergency brake function.

Each sensor unit includes an analog high-frequency part including one or multiple antennas, which is designed to emit radar signals and receive the radar echoes reflected on the objects.

In motor vehicles, FMCW radar systems (frequency modulated continuous wave) are typical, in which the frequency of the emitted signals is modulated in ramps. The received signals are then mixed with a component of the signal emitted at the same point in time so that a beat signal is obtained, whose frequency corresponds to the frequency difference between the emitted and the received signal. This frequency difference is a function of the runtime of the signal from the sensor unit to the object and back to the sensor unit and of the relative velocity of the object. The beat signal is recorded and digitized over the duration of each measurement cycle.

In a low-frequency part of the sensor unit, the digital signal is subjected to a pre-evaluation. In particular, the frequency spectrum of the beat signal is calculated by fast Fourier transform. In this spectrum, each located object stands out as a peak at a certain frequency. The frequency location of this peak gives information about the distance and the relative velocity of the object. By evaluating peaks which have been obtained from the same object at different frequency ramp slopes, the distance information and the velocity information may be separated from one another.

A further, often typical implementation form uses multiple frequency ramps including identical ramp slope which are chronologically aligned in a sequence (also called chirp sequence). A two-dimensional spectrum results with the aid of spectral analysis of each individual ramp ("fast time") and across all ramps of the sequence ("slow time").

Furthermore, instead of conventional, FMCW-based modulation forms, digitally modulated waveforms are also possible. Such a digitally modulated radar system naturally differs in the structure of the high-frequency part, but large parts may be retained in the signal processing. For example, after a corresponding demodulation of the signals, a two-dimensional frequency spectrum may also be calculated. The signal evaluation subsequent thereto may therefore take place in the same way as in the case of an analog chirp sequence.

Each sensor unit mostly includes multiple receiver channels, which evaluate the signals of multiple receiving antennas spatially offset in relation to one another. The locating angle of the objects may then be determined in the azimuth and/or in elevation on the basis of the amplitude and phase relationships between the signals received by various antennas.

Since the detection areas of the various sensor units overlap one another or are identical, a single object is generally detected by multiple sensor units, in the ideal case even by all sensor units.

In conventional radar systems, the high-frequency or analog part and the digital part of each sensor unit are implemented on separate integrated circuits (ICs). However, more recent developments are directed to creating a radar chip including an integrated analog and digital part (J. Singh, B. Ginsburg, S. Rao, and K. Ramasubramanian: "AWR1642 mm Wave sensor: 76-81-GHz radar-on-chip for short-range radar applications," White Paper SPYY006, Texas Instruments, Inc., May 2017 and "AWR1642 Single-Chip 77- and 79-GHz FMCW Radar Sensor," Datasheet SWRS203A—A Revision, Texas Instruments, Inc., April 2018).

Such chips are also referred to as SoC (system-on-chip). The RFCMOS technology including small structure sizes, for example, 22 nm, enables more and more complex SoCs to be developed for radar systems. The integration may result in significantly lower power consumption and lower costs.

In the ideal case, the chip unifies all required circuits, for example, emission and reception paths, emission activation, analog-to-digital conversion, and digital signal processing. In practice, however, the number of emission/receiver channels per chip is limited. The reasons for this are above all problems in the cooling of the chip, crosstalk between the channels, and limitations in the pin number and the package size. For this reason, not more than four emission antennas and four receiving antennas are typically implemented in one chip. For systems which require a greater number of antennas, multiple sensor units, which are each formed by a SoC, therefore have to be networked with one another.

In signal processing, the spectra of all receiver channels are typically used. These raw data spectra are integrated either coherently or non-coherently, and a threshold value detection is carried out on the resulting spectrum (M. A. Richards, "Noncoherent integration gain, and its approximation," Georgia Institute of Technology, Tech. Rep., June 2010).

For an optimal detection result, the pieces of information from all available channels of the system are always to be used, even if they are distributed over multiple SoCs. However, the problem results that the data of all SoCs have to be sent to a central processing unit. For modern radar sensors, the amount of data which has to be transferred may certainly be in the order of magnitude of several hundred megabytes to multiple gigabytes per second. This data transfer is problematic due to increased power loss, due to negative effects on the analog performance, and due to increased costs for the additionally required circuits, connections, and data lines.

To reduce the amount of data to be transferred, it is provided in U.S. Patent Application Publication No. US 2016/018511 A1 that the threshold value detection only be carried out on the basis of the channels available in each SoC. Since the detection spectrum is only integrated across part of the channels in this method, the targets contained in this spectrum have a worse signal-to-noise ratio compared to an evaluation across all channels.

A further disadvantage is that amplitudes of different strengths may only be evaluated inadequately in different channels. In the worst case, it may thus be that a target is hardly visible in a first observed SoC and is therefore not detected, while for another SoC, the target has very strong signal amplitudes and therefore may be detected very well.

The cited US patent application therefore provides carrying out the detection in two steps. In the first step, a detection having a very low threshold value is carried out on each SoC, the result being that, on the one hand, the probability decreases that a target will be overlooked and, on the other hand, the false alarm rate, i.e., the number of falsely detected targets increases as a threshold value becomes lower. Each SoC sends its detected targets to a central processing unit which subsequently carries out a second detection on the basis of all channels. For all targets which have been detected as a target on all SoCs, the second detection may be carried out using a more restrictive threshold value to obtain the final reflection list.

SUMMARY

An object of the present invention is to enable more reliable object detection including lower data volume of the communication between the various components of the system.

This object may achieved according to an example embodiment of the present invention in that
- each sensor unit calculates a short message from the radar signals received by it, whose data volume is less than the complete detection result, but which at least contains data which allow for the identification of potential objects and for the determination of a probability that the potential object is a real object, and
- at least one evaluation instance receives the entirety of all short messages of all sensor units and calculates a consolidated detection result on the basis of these short messages and selected detection results.

An advantage of this example method is that the first detection step is already not based solely on the data of a single sensor unit, but already on the data of all sensor units, by which the detection reliability is significantly improved. The reduction of the data volume is achieved in that the complete spectra of all sensor units are not transferred to the evaluation unit, but only brief outlines of the detection results which point out potential objects and implicitly or explicitly indicate an existence probability for each potential object. These existence probabilities, which may naturally only be based on the data of the particular sensor unit, are fused in the evaluation unit. This permits, with increased accuracy, only those potential objects to be discarded whose existence was consistently assessed as improbable in all sensor units. Only those parts of the spectra formed in the various sensor units which represent the objects with high existence probability then have to be used for the calculation of the consolidated detection result. In this way, the communication may be limited to the transfer of data which actually contain useful information, while parts of the spectra which only contain noise signals are not transferred at all to the evaluation instance.

Advantageous embodiments and refinements of the present invention are disclosed herein.

In one specific embodiment of the present invention, the evaluation instance is a central evaluation unit which receives the short messages of all sensor units and requests further data from the sensor units for the calculation of the consolidated detection result.

In another specific embodiment of the present invention, one of the sensor units also forms the evaluation instance. For example, the functions of the evaluation instance may be taken over by a sensor unit which includes a smaller number of receiver channels than the other sensor units, so that a uniform utilization of the sensor units (SoCs) is achieved.

In still another specific embodiment of the present invention, the functions of the evaluation instance may also be distributed onto the various SoCs which form the sensor units.

The communication network which connects the various components of the radar system to one another does not necessarily have to have a star-shaped master/slave architecture in which each sensor unit is connected to the central evaluation unit, but may also be formed by point-to-point connections between the individual components. In one advantageous specific embodiment, the communication network has a chained or annular architecture in which the data are passed on from sensor unit to sensor unit. This enables not only a reduction of the wiring complexity, but also facilitates scaling of the radar system by adding further sensor units.

The short messages calculated by the sensor units may also contain, in addition to the data for identifying the objects (for example, distances and relative velocities), intermediate results which arise during the signal evaluation in the relevant sensor unit. Examples of such intermediate results are, for example, the integrated amplitude across all channels of the relevant sensor unit, detection flags, detection counters, the local signal-to-noise ratio, and the like. To further reduce the data volume, the intermediate results or possibly also the complete short messages may be compressed.

Below, exemplary embodiments of the present invention are explained in greater detail on the basis of the figures.

BRIEF DESCRIPTION OF THE DRAWINGS

FIG. 5 shows a tabular representation of examples of short messages and detection results during the execution of the method according to an example embodiment of the present invention.

DETAILED DESCRIPTION OF EXAMPLE EMBODIMENTS

Figure 1:
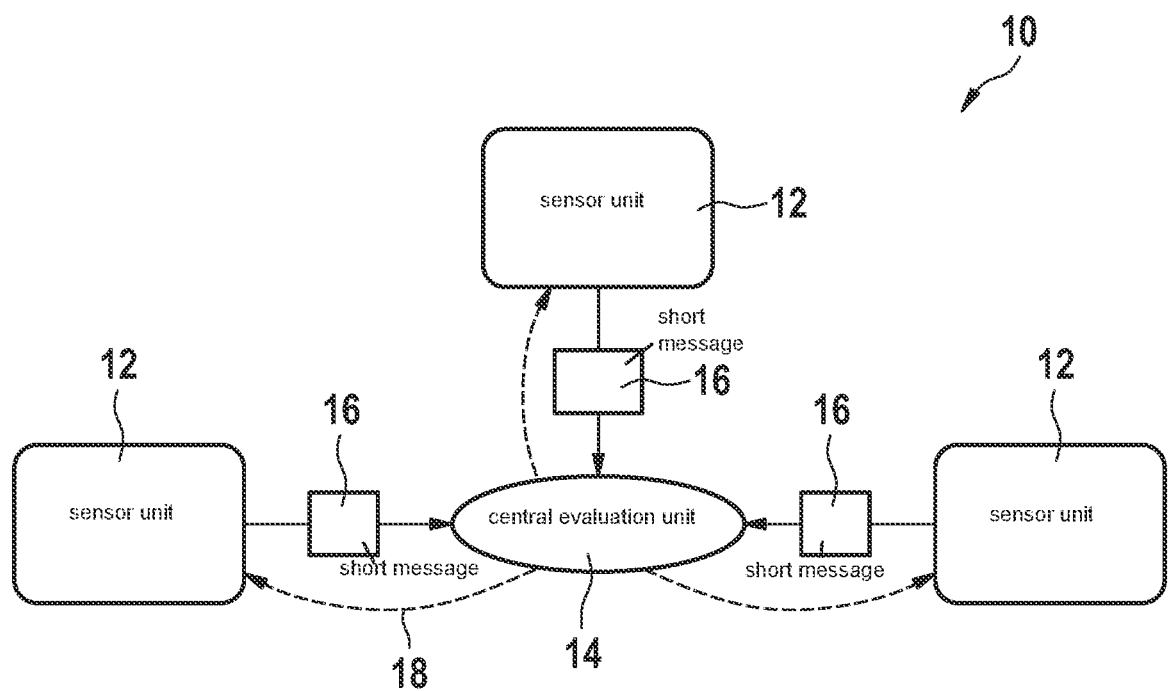
FIG. 1 shows a block diagram of a radar system, in which the method according to the present invention is usable.

In FIG. 1, a radar system 10 which includes three sensor units 12 and a central evaluation unit 14 is shown as a block diagram. Each sensor unit 12 is formed by a SoC (system-on-chip), on which the functions of the high-frequency part of a radar sensor including multiple receiver channels and the function of a digital pre-evaluation of the received signals are integrated. Central evaluation unit 14 may be formed by a processor which takes over the further evaluation of the signals pre-evaluated in the sensor units.

A communication network which connects the components of radar system 10 to one another has a star-shaped master/slave architecture including evaluation unit 14 as the master.

As an example, it is to be assumed that sensor units 12 are FMCW sensor units. The method provided here may also be carried out, however, if chirp sequences or digital modulation forms are used.

Within each measuring cycle, each sensor unit 12 calculates a two-dimensional spectrum for each of its receiver channels, in which one dimension represents the distances and the other dimension represents the relative velocity of the located objects. Each located object stands out in this spectrum as a peak which rises more or less clearly above the noise background and whose position in the spectrum indicates the distance and the relative velocity of the relevant object.

In a radar system for a motor vehicle, sensor units 12 may be installed at various locations in the vehicle or also situated jointly on a shared circuit board, preferably so that the antenna elements of all sensor units together form a one-dimensional or two-dimensional array including a large aperture, which enables an object detection with a high angle resolution in the azimuth and/or in elevation. The detection areas, thus the areas in the surroundings of the vehicle in which objects may be detected, are to be identical for all three sensor units 12 in this example, so that an object which is located inside this detection area theoretically has to be "seen" by each sensor unit 12. In evaluation unit 14, the angle positions of the object may be calculated with high resolution on the basis of the complex amplitudes of the signals which were received together for a given object in all receiver channels of all three sensor units 12.

In the case of objects which only generate a relatively weak radar echo, the peaks which are associated with these objects in the spectrum often stand out only little or not at all from the noise background, so that these objects are not detectable with equal clarity by different sensor units 12 and possibly are only detectable at all in one or two of the sensor units. If a certain signal deflection is established in a single sensor unit 12 at a specific position in the spectrum, it therefore may not be reliably decided whether this deflection is a noise signal or a real object. A certain uncertainty remains even upon evaluation of all receiver channels of the relevant sensor unit. Real objects may only be distinguished with higher reliability from the noise background when the detection results of all sensor units 12 are considered in combination in evaluation unit 14.

In the method provided here in accordance with an example embodiment of the present invention, sensor units 12 do not transfer their complete detection result, i.e., the complete two-dimensional spectrum per receiver channel, to evaluation unit 14, but rather in a first method step, each sensor unit 12 only sends a short message 16 to evaluation unit 14, which only represents a greatly shortened (compressed) outline of the detection result. In particular, it may be sufficient to carry out a single entry in short message 16 per object, even if sensor unit 12 possesses multiple receiver channels. For example, short message 16 includes a distance index and a velocity index for each object located or supposedly located by the sensor unit, which together indicate the position of the relevant peak in the spectrum, and a scalar quality measure, which indicates the probability that the detected peak is a real object. The pieces of information from multiple receiver channels may be incorporated in the calculation of the quality measure. Methods for calculating the quality measures are conventional. For example, the quality measure may be calculated on the basis of the vertex height of the peak above the noise background (preferably averaged over all receiver channels) and/or on the basis of the power integrated via the peak in relation to the noise power and/or on the basis of the quality (width) of the peak. The supposed or real object, identified by its distance index and its velocity index, is only incorporated as a detected object in short message 16 if the quality measure exceeds a certain threshold value.

Evaluation unit 14 calculates, on the basis of short messages 16 from all three sensor units, an existence probability for each object which was detected by at least one of sensor units 12. For example, this existence probability may be proportional to the sum of the quality measures which the three sensor units have reported.

In a further step, evaluation unit 14 compares the existence probability of each real or supposed object to a threshold value which is greater than the sum of the threshold values which were used in sensor units 12 for the decision as to whether or not the object is to be reported at all. Thus, for example, an object which was only just above the threshold value in all three sensor units 12 will be discarded by evaluation unit 14 as nonexistent.

With this strategy, it is possible to use a very low detection threshold in individual sensor units 12 to ensure that no relevant objects are overlooked. The number of the objects considered to be real is reduced to a realistic measure by the higher threshold value in evaluation unit 14.

Via a feedback channel 18, evaluation unit 14 sends a request to each of sensor units 12 for each object which was assessed as real to transfer a detail from the two-dimensional spectrum which contains the peak associated with this object. On the basis of these details from the spectra, evaluation unit 14 may carry out a more accurate angle estimation for each object and optionally also improve the accuracy of the measured object distances and relative velocities in that statistical variations are suppressed by averaging over the measuring results of all three sensor units. Those parts of the spectra recorded in the individual sensor units in which no real objects are located are not transferred to evaluation unit 14, so that the data volume and thus the load of the communication network are reduced without the accuracy and reliability of the detection result suffering from this.

Figure 2:
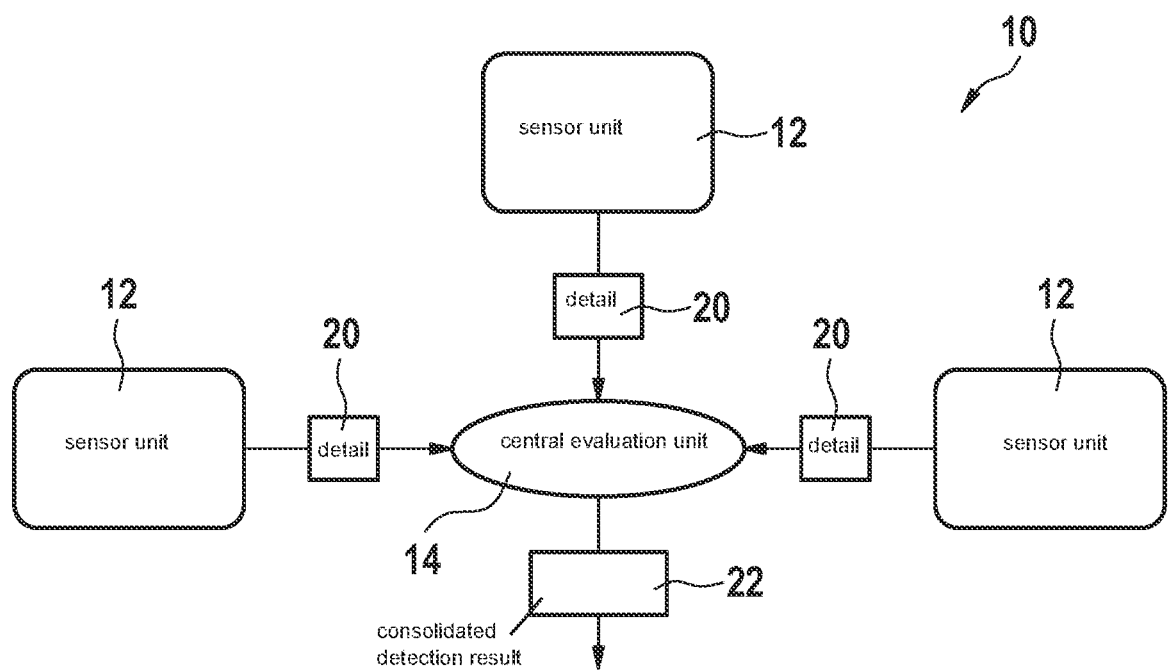
FIG. 2 shows the radar system according to FIG. 1 in a state during a later step of the method.

FIG. 2 shows radar system 10 during the execution of the second step, in that sensor units 12, on request by evaluation unit 14, transfer a detail 20 from the spectrum to evaluation unit 14 for each located object assessed as real and the evaluation unit calculates and outputs on the basis of these data a consolidated detection result 22, which contains the distance, relative velocity, and angle data of those objects which were assessed to be real.

In a modified specific embodiment of the present invention, the method may be supplemented by at least one step in that evaluation unit 14 instructs sensor units 12 which have not seen a certain object to repeat the evaluation of the spectrum at this point once again using a lower threshold value and to initially transfer the result in the form of a modified short message. The calculation of the existence probability is carried out for this object on the basis of the modified short messages.

Figure 3:
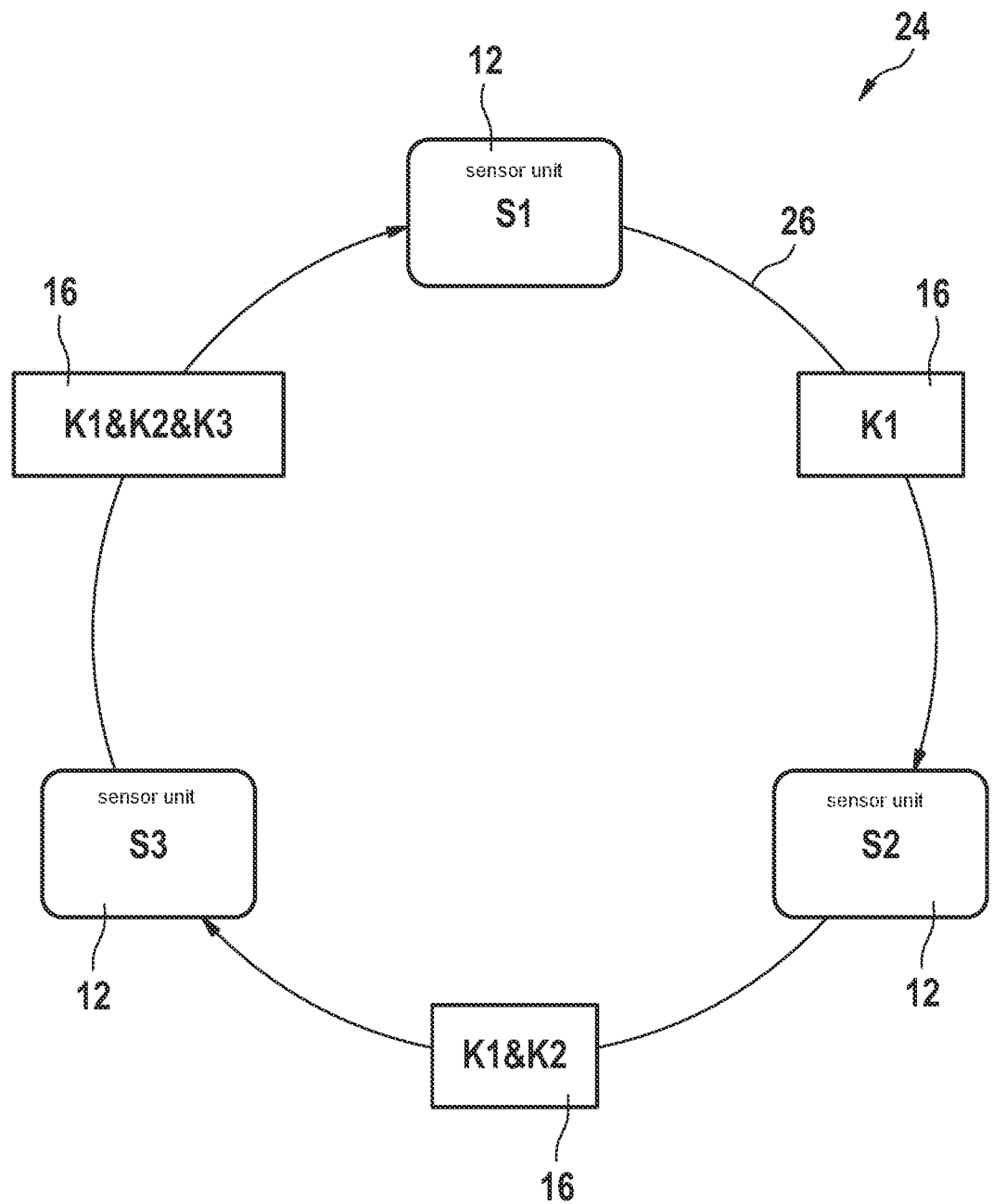
FIGS. 3 and 4 show block diagrams of a radar system according to another exemplary embodiment of the present invention.

FIG. 3 shows a further example of a radar system 24 including three sensor units 12, which communicate with one another via a ring bus 26. The sensor units are additionally identified here using labels S1, S2, and S3 for better differentiation. In radar system 24, the processors of sensor units 12 also take over at least a part of the functions for which evaluation unit 14 is provided in FIG. 1. FIG. 3 illustrates the first three steps of the evaluation method. In a first step, sensor unit S1 sends a short message 16 to sensor unit S2. This short message has content K1. This content includes the distance indices and relative velocity indices and the quality measures of all objects which were detected by sensor unit S1. In sensor unit S2, these data may be compared to the intrinsic detection result of sensor unit S2. During the comparison, sensor unit S2 supplements all intrinsic detections which were not included in short messages K1 up to this point.

Furthermore, the quality measures of all detections which were detected by both S1 and S2 are combined.

In the following, the comparison of multiple short messages is represented by the character "&". Sensor unit S2 sends a short message including content K1 & K2 to sensor unit S3. This content includes the distance and angular velocity indices of all objects which were detected by at least one of sensor units S1 and S2, and the cumulative quality measures which the sensor units have associated with these objects. In the following description, the quality measures are combined with the aid of unweighted addition, however, arbitrary mathematical operations, for example, a weighted sum, a product, or a sum of logarithmic values are also possible.

Sensor unit S3 in turn compares content K1 & K2 to its intrinsic detection result and sends a short message including content K1 & K2 & K3 back to sensor unit S1. This short message K1 & K2 & K3 contains the distance and relative velocity indices of all objects which were detected by at least one of the three sensor units, and the sum of all three quality measures which the sensor units have associated with these objects. Insofar as this relates to the determination of the existence probabilities of the objects, the short message including content K1 & K2 & K3 already represents a consolidated detection result. Sensor unit S1 uses this result to compare the sums of the quality measures to a higher threshold value and to discard as nonexistent objects for which the sum is below the threshold value.

Figure 4:
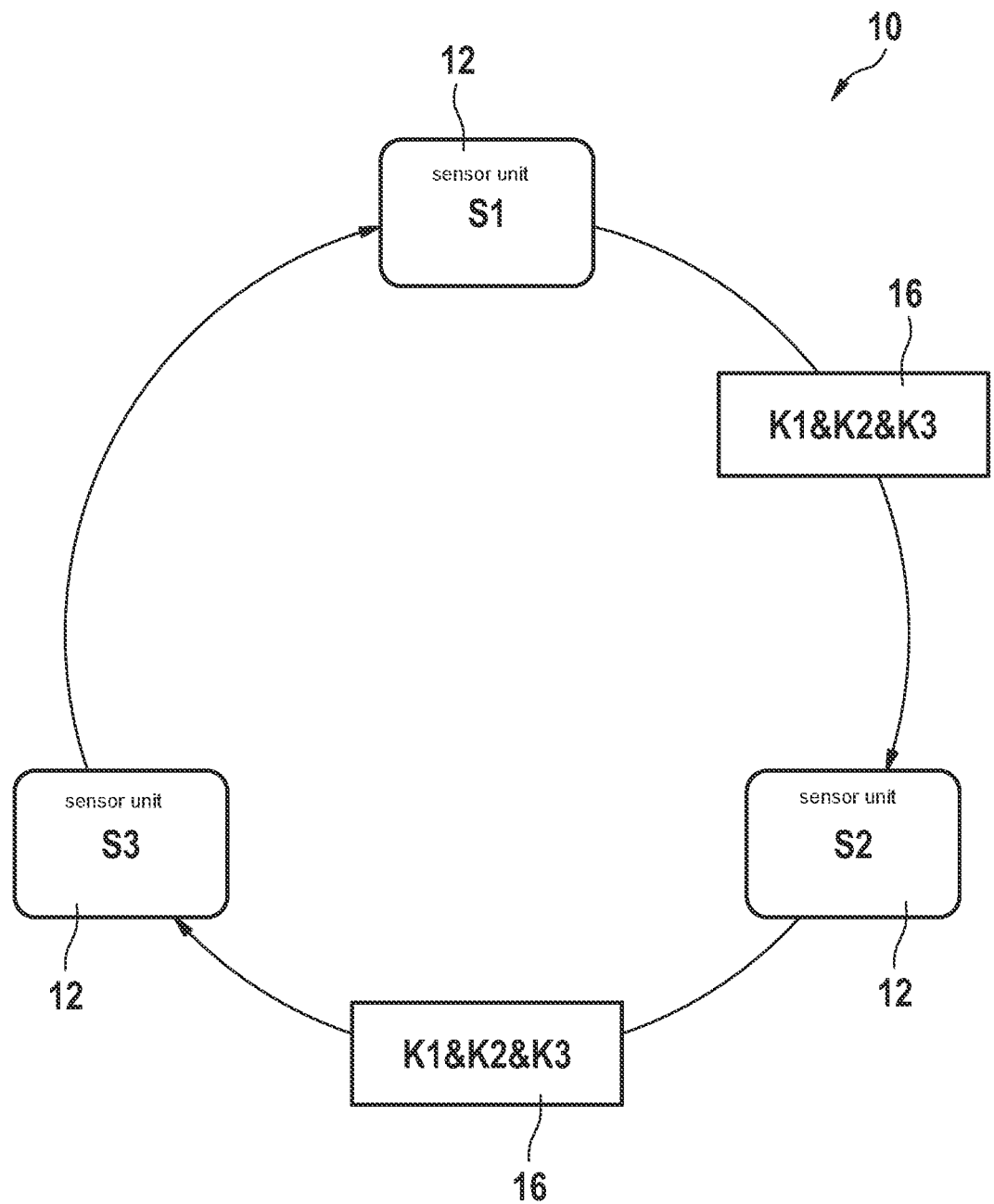

FIG. 4 shows two further steps of the method, in which detection result K1 and K2 and K3 is passed on from sensor unit S1 to sensor unit S2 and finally to sensor unit S3, so that all three sensor units have the same information level with respect to the existence probability of the objects and may each carry out the further signal evaluation on the basis of their intrinsic spectra. Ring bus 24 may optionally also be used for transferring details of spectra from one sensor unit to the next, so that at least one of the sensor units may carry out the complete evaluation which is carried out in FIG. 1 by evaluation unit 14. These evaluation functions may optionally also be distributed to the processors of different sensor units S1, S2, and S3, however, for example, in that the objects considered to be real, for which the further evaluation is to take place, are allocated between the three sensor units so that a uniform utilization is achieved.

In another specific embodiment (not shown), however, certain evaluation functions, for example, the angle estimation, may also be delegated to a central evaluation unit.

In FIG. 5, possible contents of the short messages exchanged in radar system 24 are shown in table form. Each table contains, in first column D, the distance index of the located objects, in second column V, the relative velocity index, and in the third column, quality measure Q. Sensor unit S1 has located six objects A through F in this example, so that short message K1 is made up of six lines.

Sensor unit S2, in contrast, has only detected four objects, so that short message K2 only includes four lines. In two lines, namely the second and the fourth, the distance and relative velocity indices are the same as in the case of objects C and E in short message K1. These lines or the associated objects may therefore be identified with objects C and E. In contrast, there is no correspondent in short message K1 for the distance and relative velocity indices in the two remaining lines, so that these are "new" objects here, which were only seen by sensor unit S2.

Short message K1 & K2 combines short messages K1 and K2. Two lines were appended to short message K1 for the two new objects G and H. In addition, the quality measures were added in column Q in the case of objects C and E, which were seen by both sensor units.

Sensor unit S3 has detected the four objects A, B, E, and F, which were also detected by sensor unit S1, and three further objects I, J, and K, which were detected by neither of the other two sensor units.

Short message K1 & K2 & K3 combines the contents of short messages K1, K2, and K3. Accordingly, three further lines for objects I, J, and K were appended to short messages K1 and K2, and the quality measures from K3 and K1 & K2 were added in column Q for the objects A, B, E, and F.

To form the consolidated detection result, in this example, the threshold value for the quality measure was set to the value 10 in sensor unit S3. Objects D, G, H, I, and K, which do not reach this threshold value 10 in K1 & K2 & K3, are therefore discarded as mock objects. In this way, a consolidated short message K0 is obtained, which only contains the data of the objects considered to be real and forms the basis for the calculation of the consolidated detection result.

What is claimed is:

1. A method of vehicle control performed with a radar system of a vehicle, the method comprising:
    with respect to each of at least some of a plurality of sensors of the radar system that (I) each (i) is embodied on a respective one of a plurality of hardware chips and (ii) includes a respective plurality of receiver antennas and a respective sensor unit processor, and (II) have overlapping fields of view of a surrounding environment of the vehicle:
        obtaining, by the respective plurality of receiver antennas of the respective sensor, radar signal reflections, thereby providing a respective raw radar signal metrics;
        identifying, by the respective sensor unit processor, one or more respective objects in the surrounding environment;
        the respective sensor unit processor selecting, from the identified one or more respective objects, a respective one or more selected objects;
        based on the selecting, generating, by the respective sensor unit processor, a respective message regarding each of the respective one or more selected objects, the generation of the message being performed according to respective portions of the raw radar signal metrics that correspond to the respective one or more selected objects, and the message not including the raw radar signal metrics and including, for each of the respective one or more selected objects, a respective probability that the respective selected object is a real object present in the surrounding environment, the respective probability being based on the raw radar signal metrics; and
        directly or indirectly transmitting, by the respective sensor, the generated respective message to a consolidation processor that is on a different hardware chip than the plurality of sensor unit processors;

selecting, by the consolidation processor and from all of the selected objects of the messages that are from all of the at least some of the plurality of sensors, a subset of the selected objects, the selection by the consolidation processor being based on a combination of content of the messages from all of the at least some of the plurality of sensors;

generating, by the consolidation processor, a radar output providing an indication regarding the subset of the selected objects relative to the surrounding environment; and performing, by the vehicle, a vehicle drive control based on the radar output.

2. The method as recited in claim 1, wherein:
the sensor unit processors associate a quality measure with each of the identified objects as a measure for the probability that the respective object is a real object and the selection by the respective sensor unit processor is of only those of the identified objects whose quality measure is above a first predefined threshold; and
the selection by the consolidation processor is of only those of the objects for which a cumulative quality measure formed from the quality measures of all of the sensors is above a second predefined threshold.

3. The method as recited in claim 2, further comprising:
for each of the objected selected by the consolidation processor not represented in each of at least one respective one of the messages, transmitting, by the consolidation processor and to the respective one of the sensors that has transmitted the respective one of the messages, an instruction to lower a value of the first threshold and to send a new message based on the lower value of the first threshold.

4. The method as recited in claim 1, wherein the consolidation processor calculates for each of the objects of the transmitted messages, a respective existence probability of the respective object based on content of the messages, and the selection by the consolidation processor is based on a result of the calculation, the method further comprising:
for each object of the selected subset, the consolidation processor sending to one or more of the plurality of sensors, a request for additional details characterizing the respective object of the selected subset.

5. The method as recited in claim 1, wherein the message is transmitted over a communication network, the method further comprising the sensors communicating with one another via the communication network.

6. The method as recited in claim 1, wherein the communication network is formed as a ring bus.

7. The method as recited in claim 1, wherein the consolidation processor is at least partially implemented as a respective processor of one of or a combination of the plurality of sensors that is also configured to perform the obtaining of radar signal reflections, the identifying, the selecting of the one or more selected objects from the identified one or more respective objects, and the generating and transmitting of the respective message.

8. The method as recited in claim 1, wherein the sensors each includes multiple transmitter channels.

9. The method as recited in claim 1, wherein the hardware ships are SoC chips, in which functions for transmitting radar signals and receiving the radar signal reflections are integrated.

10. The method as recited in claim 1, further comprising:
based on the selection of the subset of the selected objects, transmitting, by the consolidation processor and to at least one of the plurality of sensors, a request for metrics regarding the selected objects of the subset; and
in response to the request, receiving, by the consolidation processor from each of the at least one of the plurality of sensors, a portion of the respective raw radar signal metrics of the respective sensor that corresponds to the selected objects of the subset, wherein the radar output is generated by the consolidation processor based on the received portion of the respective raw radar signal metrics of all of the at least one of the plurality of sensors.

11. The method as recited in claim 1, wherein the raw radar signal metrics are spectra based on peaks in which the identification, by the sensor unit processors, of the one or more respective objects is performed.

12. The method as recited in claim 11, wherein the generated messages include a characterization of the respective selected objects that is based on the spectra.

13. The method as recited in claim 12, wherein the characterization includes a distance measure, a velocity measure, and a quality measure.

* * * * *